United States Patent
Morris et al.

(10) Patent No.: US 10,906,426 B2
(45) Date of Patent: Feb. 2, 2021

(54) VARIABLE CHARGING STRATEGY FOR PLUGIN ELECTRIC VEHICLES

(71) Applicant: Ford Global Technologies, LLC, Dearborn, MI (US)

(72) Inventors: Phillip Morris, Redford, MI (US); Nayaz Khalid Ahmed, Canton, MI (US); Jimmy Kapadia, Ottawa Hills, OH (US); Daniel Lewis Boston, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 181 days.

(21) Appl. No.: 16/150,715

(22) Filed: Oct. 3, 2018

(65) Prior Publication Data
US 2020/0108726 A1 Apr. 9, 2020

(51) Int. Cl.
*B60L 58/13* (2019.01)
*B60L 53/00* (2019.01)

(52) U.S. Cl.
CPC ............. *B60L 58/13* (2019.02); *B60L 53/00* (2019.02)

(58) Field of Classification Search
CPC .......... B60L 58/13; B60L 53/00; B60L 58/16; B60L 2260/54; B60L 50/15
See application file for complete search history.

(56) References Cited

U.S. PATENT DOCUMENTS

| | | | |
|---|---|---|---|
| 8,963,494 B2 | 2/2015 | Kishiyama et al. | |
| 8,975,866 B2* | 3/2015 | McGrath | B60L 11/1809 320/109 |
| 9,306,412 B2* | 4/2016 | Yokoyama | H02J 7/00716 |
| 9,713,962 B2* | 7/2017 | Payne | B60L 11/1838 |
| 9,739,624 B2 | 8/2017 | Rajagopalan et al. | |
| 10,220,718 B2* | 3/2019 | Malik | B60L 53/52 |
| 2009/0114463 A1* | 5/2009 | DeVault | B60K 6/46 180/65.29 |
| 2012/0169608 A1* | 7/2012 | Forutanpour | H04W 52/027 345/173 |
| 2014/0070606 A1* | 3/2014 | Gibeau | B60K 37/02 307/9.1 |
| 2014/0082384 A1* | 3/2014 | De Cesare | G06F 1/3206 713/320 |
| 2014/0101476 A1* | 4/2014 | Lu | G06F 1/3212 713/340 |
| 2015/0120107 A1* | 4/2015 | Yu | B60W 20/00 701/22 |
| 2015/0329003 A1* | 11/2015 | Li | B60L 3/12 320/134 |
| 2017/0129359 A1* | 5/2017 | Dunlap | B60L 11/1861 |

* cited by examiner

Primary Examiner — Thomas Ingram
(74) Attorney, Agent, or Firm — David B. Kelley; Brooks Kushman P.C.

(57) ABSTRACT

A vehicle includes a battery. The vehicle includes a controller configured to inhibit battery charge. The charge inhibition is responsive to state of charge (SOC) of the battery achieving a cascading ceiling threshold during grid charge that decreases each day of a multiday period such that each day an SOC increase during the grid charge to achieve the ceiling threshold is same and the SOC achieves a floor threshold upon completion of a final day drive cycle of the multiday period.

14 Claims, 4 Drawing Sheets

VARIABLE CHARGING STRATEGY FOR PLUGIN ELECTRIC VEHICLES

TECHNICAL FIELD

This disclosure relates to variable charging strategies for plugin electric vehicles.

BACKGROUND

Electric and hybrid electric vehicles may be grid charged following daily use or other cyclic periods. The grid charging may maintain battery state of charge (SOC) at full charge until use during the next cycle. Maintenance of batteries at full SOC may decrease the useful life of the battery or impact overall battery capacity.

SUMMARY

A vehicle includes a battery. The vehicle includes a controller configured to inhibit battery charge. The charge inhibition is responsive to state of charge (SOC) of the battery achieving a cascading ceiling threshold during grid charge that decreases each day of a multiday period such that each day an SOC increase during the grid charge to achieve the ceiling threshold is same and the SOC achieves a floor threshold upon completion of a final day drive cycle of the multiday period.

A vehicle includes a traction battery. The vehicle includes a controller configured to inhibit traction battery charging. The charging inhibition is responsive to state of charge (SOC) of the traction battery reaching a ceiling threshold that is set according to a floor threshold plus an average of overall energy consumption of the vehicle for a number of preceding drive cycles.

A vehicle includes a battery. The vehicle includes a controller configured to inhibit battery charge. The charge inhibition is responsive to state of charge (SOC) of the battery achieving a cascading ceiling threshold during grid charge that decreases each day of a multiday period such that each day an SOC increase during the grid charge to achieve the ceiling threshold based on an average consumption for a given day of the multiday period and the SOC achieves a floor threshold upon completion of a final day drive cycle of the multiday period.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traction batteries may be charged when the vehicle is parked near a grid charging station. For example, home and workplaces alike may provide access to utility electrical grids for charging. Maintaining vehicle traction batteries above a charge ceiling or below a charge floor may decrease battery longevity. That is, battery life may be extended by maintaining the battery SOC between a ceiling and floor threshold as often as possible. For example, maintaining a battery below an SOC ceiling of 80% may increase battery life while maintaining a battery above an SOC floor of 20% may increase battery life. Indeed, a cascading ceiling charge threshold based on driving habits ensures that battery SOC stays within such thresholds while providing adequate energy for travel.

Figure 1:
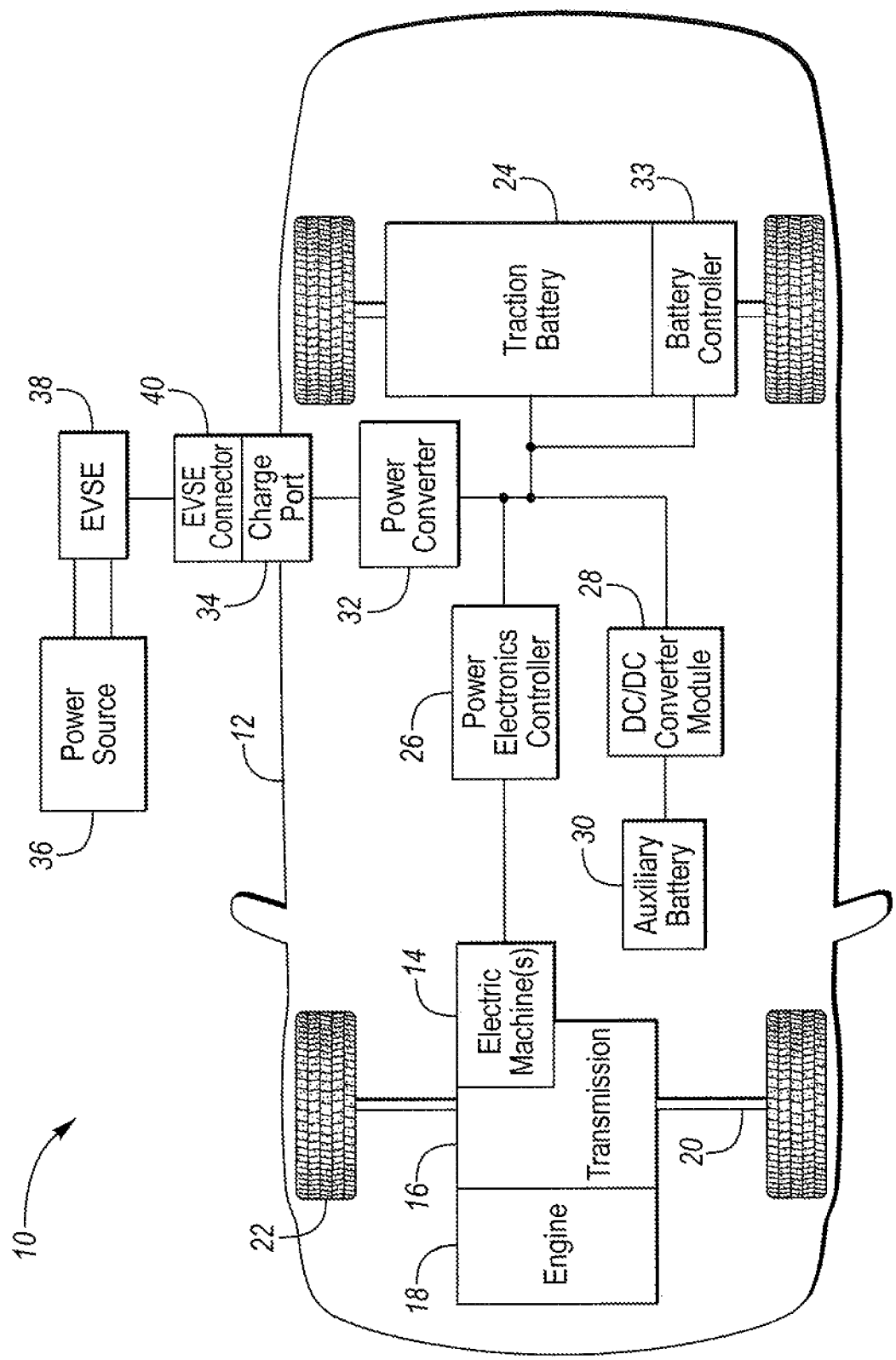
FIG. 1 is a schematic diagram of a plugin hybrid electric vehicle.

FIG. 1 depicts a block diagram 10 illustrating a vehicle 12 comprising one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery (or battery pack) 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics controllers 26 through one or more contactors (not shown). The one or more contactors isolate the traction battery 24 from other components when opened and connect the traction battery 24 to other components when closed.

The power electronics controller 26 may also be electrically connected to the electric machines 14 and may be configured to bi-directionally transfer electrical energy between the traction battery 24 and the electric machines 14. For example, the traction battery 24 may provide a DC voltage while the electric machines 14 may require a three-phase AC voltage to function. The power electronics controller 26 may convert the DC voltage to a three-phase AC voltage as required by the electric machines 14. In a regenerative mode, the power electronics controller 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter 28. The low-voltage systems may be electrically connected to an auxiliary battery 30 (e.g., 12V battery).

A battery control module 33 may be in communication with the traction battery 24. The battery controller 33 may be configured to monitor and manage operation of the traction battery 24, such as via an electronic monitoring system (not shown) that manages temperature and charge state of each of the battery cells.

The vehicle 12 may be, for example, an electrified vehicle that includes components for a plug-in hybrid electric vehicle (PHEV), a full hybrid electric vehicle (FHEV), a mild hybrid electric vehicle (MHEV), or a battery electric vehicle (BEV). The traction battery 24 may be recharged by an external power source 36. The external power source 36 may be a connection to an electrical outlet. The external power source 36 may be electrically connected to electric vehicle supply equipment (EVSE) or charge station 38. The charge station 38 may provide circuitry and controls to regulate and manage the transfer of electrical energy between the power source 36 and the vehicle 12. The external power source 36 may provide DC or AC electric power to the charge station 38.

The charge station 38 may have a charge connector 40 for plugging into a charge port 34 of the vehicle 12. The charge port 34 may be any type of port configured to transfer power from the charge station 38 to the vehicle 12. The charge port 34 may be electrically connected to a charger or on-board power converter 32. The power converter 32 may condition the power supplied from the charge station 38 to provide the proper voltage and current levels to the traction battery 24. The power converter 32 may interface with the charge station 38 to coordinate the delivery of power to the vehicle 12. The charge station connector 40 may have pins that mate with corresponding recesses of the charge port 34.

Figure 2:
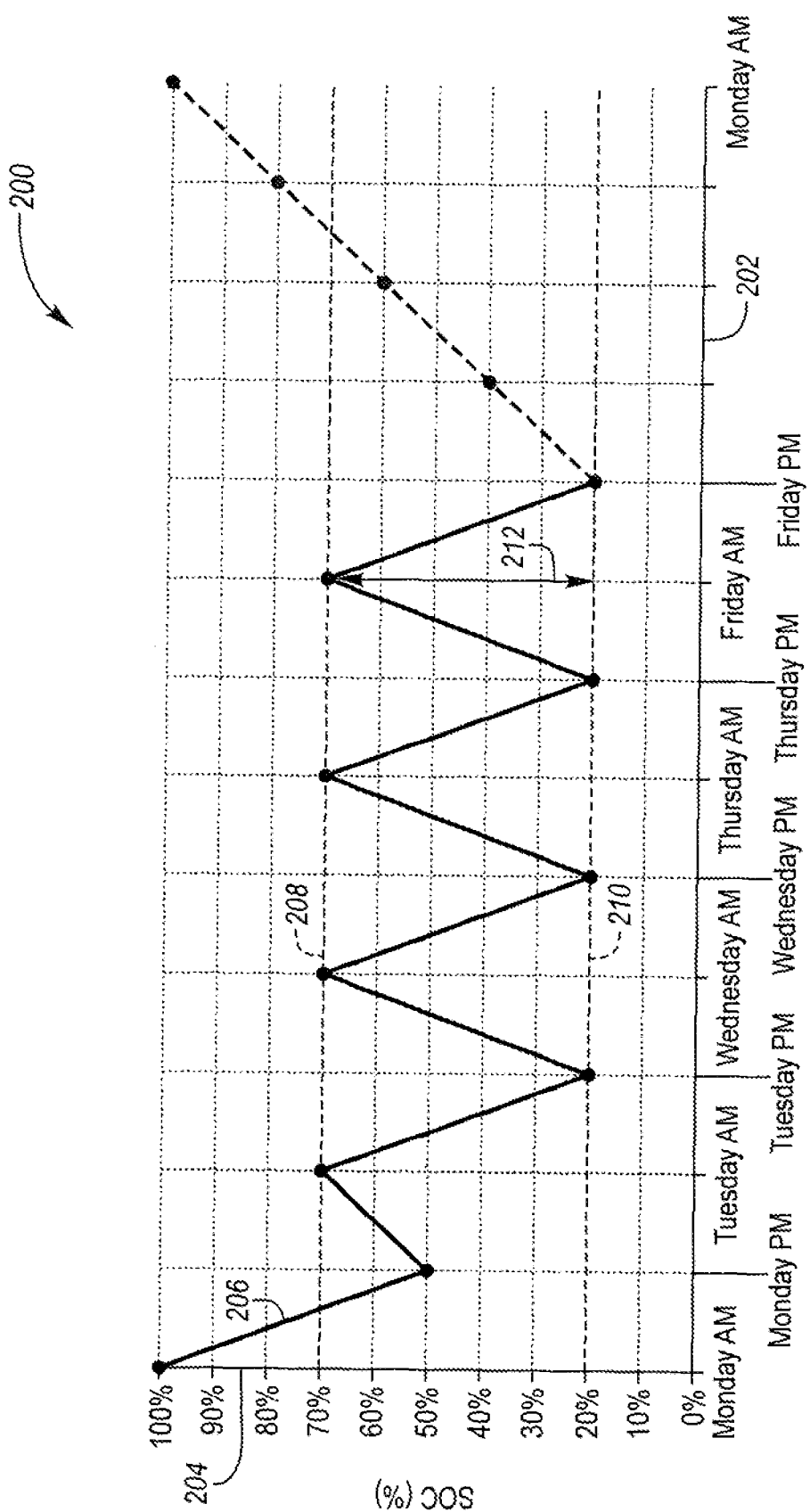
FIG. 2 is a graph of an SOC of a traction battery being charged daily to a ceiling threshold.

FIG. 2 depicts a graph 200. The graph 200 includes a horizontal axis 202 that includes cycles (e.g., days) of the week for battery charging. The graph 200 includes a vertical axis 204 for depicting the SOC of traction battery 24. The graph 200 includes a curve 206 that oscillates over time according to drive cycles of the vehicle 12. For example, the curve 206 begins with an SOC of 100% on Monday in the AM. During the first drive cycle the SOC drops 50%—the average of overall energy consumption 212 of the vehicle for a number of preceding drive cycles. Upon return to a grid charge station, the SOC is increased only 20% to the ceiling threshold 208 from Monday to Tuesday, preventing overcharge of the battery behind the ceiling threshold 208. The ceiling threshold 208 may vary from vehicle to vehicle, from battery type to battery type, and based on the previous use of the battery. For example, the ceiling threshold may be adjusted based on the age or previous use of the battery to improve battery longevity.

Additionally, different battery configurations and chemical compositions may require distinct ceiling thresholds. The ceiling threshold 208 may be based on an overall energy consumption of the vehicle for a number of preceding drive cycles. The overall energy consumption 212 may be an average of consumption of the vehicle for the number of preceding drive cycles. For example, a vehicles historical use may be averaged over the previous 100 drive cycles. Any type of statistical analysis may be used to determine the overall energy consumption. For example, a Gaussian analysis of historical consumption may be used where mean, median, or other parameters are used or employed to determine the ceiling, floor, or overall energy consumption 212 to ensure that battery SOC is maintained within the ceiling and floor associated with the battery. On average the cyclic consumption between ceiling 208 and floor 210 ends near the floor 210.

Figure 3:
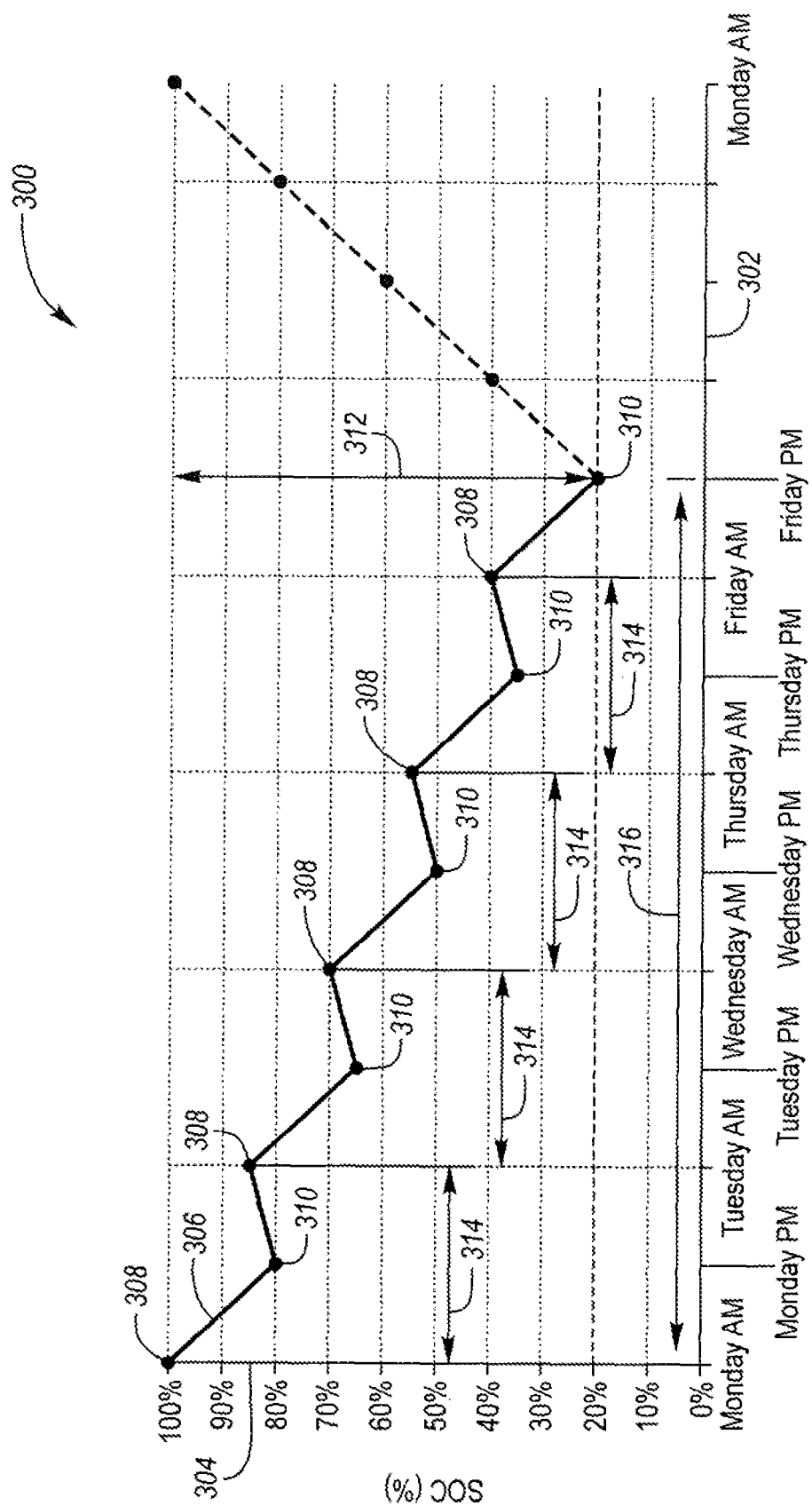
FIG. 3 is a graph of an SOC of a traction battery being charged daily to a cascading ceiling threshold.

Referring to FIG. 3, a graph 300 depicts a cascading charge ceiling. The graph 300 includes horizontal axis 302 that includes a multiday period (e.g., Monday through Friday). The graph 300 includes a vertical axis 304 for depicting the SOC of traction battery 24. The traction battery 24 SOC is shown via battery SOC 306. The battery SOC 306 includes a cascading ceiling threshold 308. The cascading ceiling threshold 308 decreases every day of the multiday period 316 to a daily floor threshold 310, which achieves an absolute minimum on the last day of the multiday period 316. Although shown as having a maximum SOC of 100%, battery SOC 306 may also start at a lower ceiling. The ceiling may be determined by the overall energy consumption of the vehicle averaged over preceding multiday periods. That is, average consumption 312 over preceding multiday periods may be calculated and used to ensure that the vehicle will, on average, reach the floor threshold 310. The battery SOC 306 decreases each day 314 of the multiday period 316 such that the last floor threshold 310 obtained is, on average, greater than or equal to the floor threshold 310 associated with battery longevity.

The cascading ceiling threshold 308 may be decrease proportionately according to a number of cycles of the multicycle period. For example, the overall energy consumption 312 may be portioned equally for each day 314 of the multiday period 316. That is, if the overall energy consumption is 120% battery SOC, the cascading ceiling threshold 308 would decrease 15% per day from an initial charge of 100% SOC, ensuring the battery SOC 306 reaches floor threshold 310 at the end of the final day, Friday, of the multiday period 316. It should be appreciated that any cycle time may be used and is contemplated by this disclosure. For example, the cycle time may be minutes, hours, days, weeks, months, years, or other time segments. The floor threshold 310 may also be defined by a battery efficiency factor related to current draw efficiency of the battery at the given SOC. For example, it may be known that battery efficiency decreases below an SOC threshold and the floor 310 may be set to ensure that threshold is not exceeded.

Figure 4:
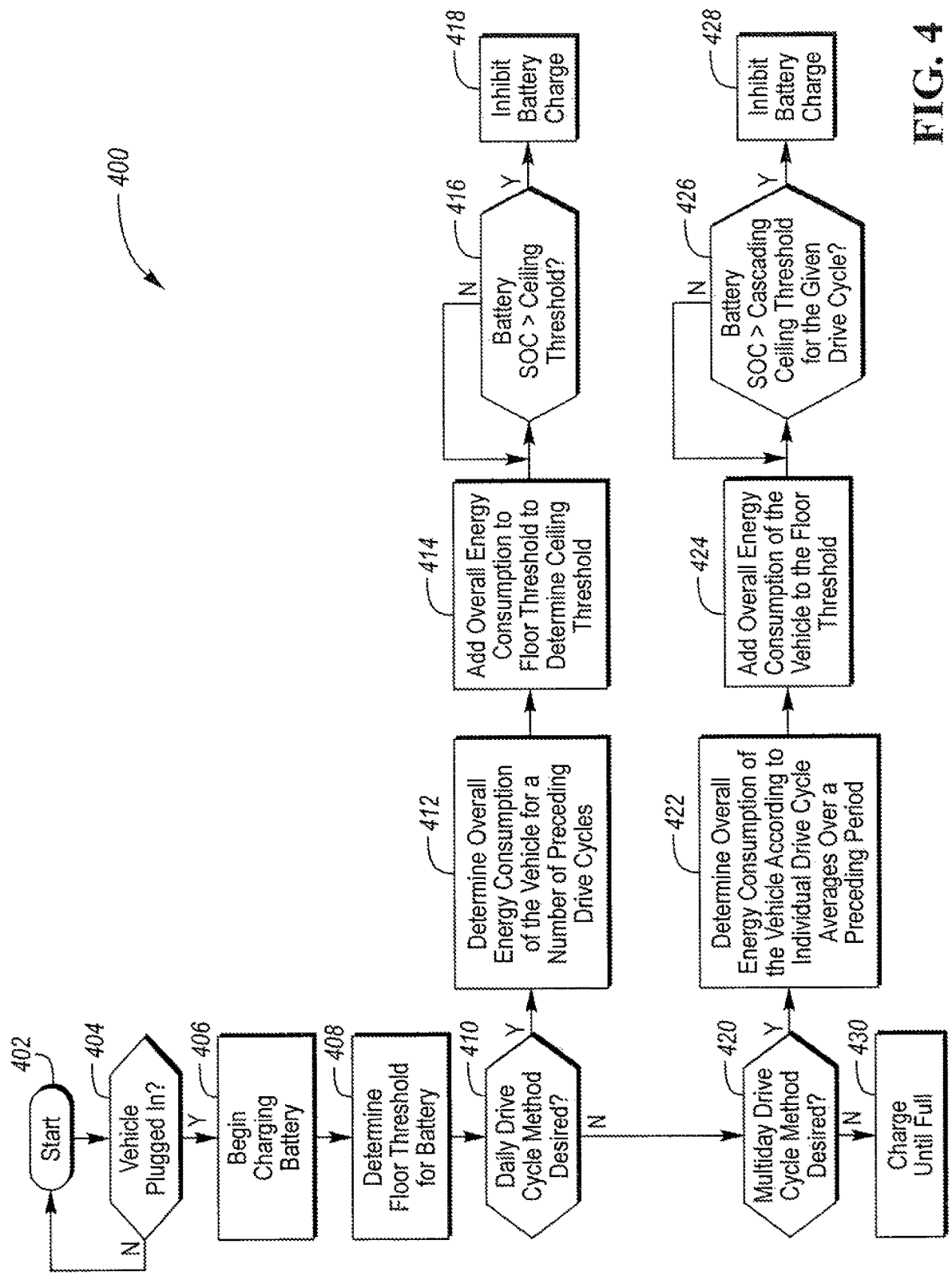
FIG. 4 is an algorithm for charging a traction battery to a ceiling threshold.

FIG. 4 depicts an algorithm 400 for implementing the ceiling threshold 208 and cascading ceiling threshold 308. The algorithm 400 starts in step 402. It should be appreciated that the steps may be performed in any order and that any of the steps may be omitted or repeated. Additional steps may further be performed that are not disclosed. In step 404, the controller 33 determines or receives indication that the vehicle 12 is plugged in. In step 406 the controller 33 allows for battery charge. In step 408, the controller 33 determines the floor threshold 310 for the battery 24. The floor threshold 310 may be based on battery longevity limits associated with the particular traction battery used. The floor threshold 310 may be based on the efficiency of the battery at particular power levels, ensuring the battery operates in an efficient range. The floor threshold 310 may be set based on other factors or a combination of the mentioned factors. In step 410, the controller 33 determines the type of charge cycle desired. If the daily charge cycle is desired as depicted in FIG. 2, the algorithm proceeds to step 412. In step 412, the controller determines the overall energy consumption of the vehicle for a number of preceding drive cycles. For example, the controller 33 may average the previous 90 days of overall energy consumption of the vehicle. The controller 33 may take the entire yearly average. The controller 33 may average the daily consumption of the vehicle 12 for the entire history of vehicle operation. In step 414, the controller adds the overall energy consumption 212 to the floor threshold 210 to determine the ceiling threshold 208. While charging, if the battery SOC is greater than the ceiling threshold 208 in step 416, the controller 33 inhibits battery change in step 418.

If the daily drive cycle method is not desired in step 410, the controller 33 determines whether the multiday drive cycle charge method is desired in step 420. The algorithm 400 then proceeds to step 422. In step 422, the controller determines the overall energy consumption of the vehicle for a number of preceding drive cycles. For example, the controller 33 may average the previous 90 multiday periods 416 of overall energy consumption 312 of the vehicle. The controller 33 may take the entire yearly average of multiday periods 416. The controller 33 may average the multiday periods 316 of the vehicle 12 for the entire history of vehicle operation. In step 424, the controller adds the overall energy consumption 212 to the floor threshold 310 to determine the ceiling threshold 308. While charging, if the battery SOC is greater than the cascading ceiling threshold 308 in step 426, the controller 33 inhibits battery change in step 428. If neither charge option is selected in steps 410, 420 the controller charges the battery until the state of charge is full in step 430.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a battery; and
   a controller configured to, responsive to a state of charge (SOC) of the battery achieving a cascading ceiling threshold during grid charge that decreases each day of a multiday period such that each day an SOC increase during the grid charge to achieve the ceiling threshold is the same and the SOC achieves a floor threshold upon completion of a final day drive cycle of the multiday period, inhibit battery charge.

2. The vehicle of claim 1, wherein the cascading ceiling threshold is based on an overall energy consumption of the vehicle averaged according to preceding multiday periods.

3. The vehicle of claim 1, wherein the cascading ceiling threshold is defined to decrease proportionate to a number of days of the multiday period.

4. The vehicle of claim 1, wherein the cascading ceiling threshold is defined to decrease proportionate to an average SOC decrease of each day of the multiday period.

5. The vehicle of claim 1, wherein the floor threshold is based on a depleted battery efficiency point.

6. The vehicle of claim 1, wherein the grid charge is provided by a plugin connector.

7. A vehicle comprising:
   a traction battery; and
   a controller configured to, responsive to a state of charge (SOC) of the traction battery reaching a ceiling threshold that is set according to a floor threshold and an average of overall energy consumption of the vehicle for a number of preceding drive cycles, inhibit traction battery charging, wherein the floor threshold is based on a depleted battery efficiency point.

8. The vehicle of claim 7, wherein the average is variable according to a day of a week.

9. A method comprising:
   by a controller, responsive to a state of charge (SOC) of a battery achieving a cascading ceiling threshold during grid charge that decreases each day of a multiday period such that each day an SOC increase during the grid charge to achieve the ceiling threshold is the same and the SOC achieves a floor threshold upon completion of a final day drive cycle of the multiday period, inhibit battery charge.

10. The method of claim 9, wherein the cascading ceiling threshold is based on an overall energy consumption of a vehicle averaged according to preceding multiday periods.

11. The method of claim 9, wherein the cascading ceiling threshold is defined to decrease proportionate to a number of days of the multiday period.

12. The method of claim 9, wherein the cascading ceiling threshold is defined to decrease proportionate to an average SOC decrease of each day of the multiday period.

13. The method of claim 9, wherein the floor threshold is based on a depleted battery efficiency point.

14. The method of claim 9, wherein the grid charge is provided by a plugin connector.

\* \* \* \* \*